Dec. 19, 1950   B. D. EMANUEL   2,534,582
STORAGE BATTERY
Filed April 26, 1948
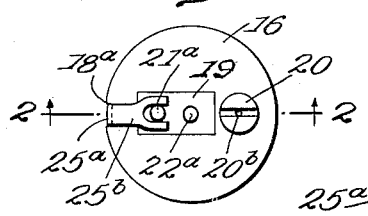
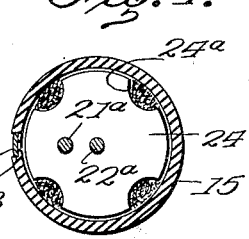
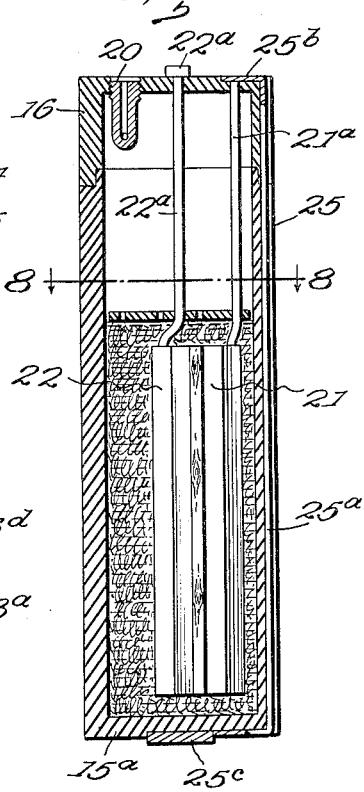
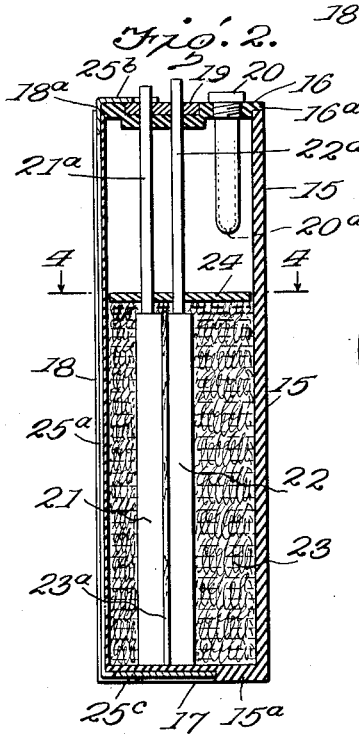
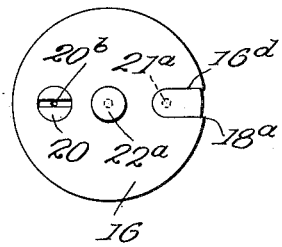
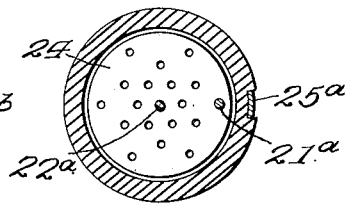
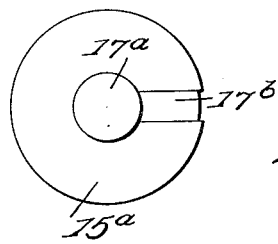
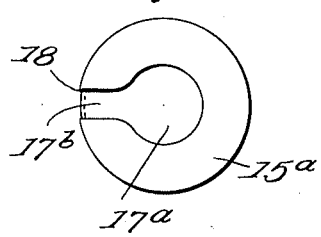
INVENTOR.
B. D. Emanuel
BY
Attys.

Patented Dec. 19, 1950

2,534,582

UNITED STATES PATENT OFFICE 2,534,582

STORAGE BATTERY

Benjamin D. Emanuel, Anderson, Ind.

Application April 26, 1948, Serial No. 23,309

9 Claims. (Cl. 136—6)

This invention relates to improvements in storage batteries dimensioned for service in flashlights or other industrial conditions which require the use of a compact form of battery. The field of service of the present battery has heretofore been generally supplied by batteries of the dry cell type.

The fact that batteries used in flashlight service generally require that the two terminals be located at opposite ends of the battery, while for many industrial uses both terminals are located at the same end of the battery, has generally required the development of separate batteries for the different fields, due to the fact that even where the battery may structurally expose both terminals at the same end, the arrangement which would transfer one of the terminals to the opposite end is such as to make it a permanent part of the battery, so that the latter becomes a battery of a particular type.

The present invention is designed more particularly to permit the use of the battery in either of such fields at will. In other words, the field of service is not predetermined by the manufacturer, but is made optional with the user. The battery is formed so as to be usable in either field, and the selection of the service field is left with the user, who is able to change from one field to the other at will. As a result, the manufacturing costs are greatly reduced, since the battery construction for both services is similar with the user completing the addition when the service requires the presence of opposite end terminals. The user simply snaps a preformed element into position when the latter service is desired, and bodily removes the element when the battery is again used in industrial service with the terminals at the same end.

A number of advantageous possibilities result from these conditions. The battery is produced under standardized conditions, thus minimizing costs and simplifying structure. Since the battery is rechargeable at will, it tends to long-life serviceability. Since the terminals emerge from the casing at one end only, the opposite end is permanently leak-proof. The terminal mounting is rigid and durable. The battery is readily assembled and maintained serviceable. The preformed element used to provide the opposite terminal is positioned wholly external of the battery casing, thus retaining the casing intact regardless of shift in the field of service.

To these and other ends, therefore, the nature of which will be made apparent as the invention is hereinafter disclosed in detail, said invention consists in the improved constructions and combinations of parts hereinafter particularly described in detail, illustrated in the accompanying drawings, and more particularly pointed out in the appended claims.

In the accompanying drawings, in which similar reference characters indicate similar parts in each of the views, Figure 1 is a top plan view of a preferred form of battery according to the present invention;

Figure 2 is a longitudinal sectional view of the battery taken on line 2—2 of Figure 1;

Figure 3 is a bottom plan view of the battery casing;

Figure 4 is a cross-section taken on line 4—4 of Figure 2;

Figure 5 is a longitudinal section of a modified form of battery;

Figure 6 is a top plan view of the same;

Figure 7 is a bottom plan view of the same; and

Figure 8 is a cross-section taken on line 8—8 of Figure 5.

The present application is a continuation in part of my application for Battery, filed May 19, 1947, Serial No. 748,945, now abandoned.

The battery disclosed herein embodies a casing body 15, formed of plastic material of suitable type, a cover 16 therefor which carries the electrode terminals together with the venting structure, and the internal content hereinafter described in detail.

The casing body 15 is in the form of an elongated cup-shaped structure, preferable generally circular in cross-section, and of desired overall dimensions, the open top being designed to receive the cover 16, with the latter cemented to the body. The bottom 15a is integral with the body and is of sufficient thickness to permit of the presence of an external depression 17, designed to receive the lower end of the preformed optional element when the battery is equipped for opposite terminal service. The depression 17 is formed with an enlarged portion 17a, preferable axially alined with the axis of the battery, and a channel 17b leading thereto from the periphery of the bottom, thus producing an anchorage effect for the lower end of the added element when the latter is snapped into position.

Channel 17b leads to a groove or channel 18 formed externally on and extending longitudinally of the body for its full length. The channel 18 is of a desired width and has a depth sufficiently greater than the thickness of the preformed element as to assure that the latter, when positioned therein, will lie inside of the circular contour and therefore be protected by the projecting portions of the side walls of the groove or channel, thus preventing unintentional external contact with the elements. Obviously, whether or not the enlarged portion 17a, channel 17b, or groove 18 be occupied by the element does not affect the casing structure, so that the presence of these as a permanent part of the casing provides no disadvantage.

The cover 16 seats on the top of the side wall of casing 15 and is provided with an annular shoulder 16a which fits the interior of the casing, produced by thickening the cover wall. The cover periphery also carries a channel 18a designed to be alined with and form a continuation of channel 18. A mid-zone of the cover is formed with a zone 19 depressed with respect to the cover top face, this zone 19 being elongated, and preferably of rectangular contour, and projects within the upper zone of the interior of the casing. The bottom wall of the zone 19 is designed to carry the two terminals of the battery, such bottom wall being provided with openings for the passage of the terminals, one of which preferably is located in alinement with the axis of the battery, with the other terminal spaced therefrom in the direction of channel 18a. The axial terminal projects a greater distance above the top of the cover than the other terminal, as shown, since it forms the permanent terminal for this end of the battery.

The depressed zone 19 is designed to eliminate the usual practice of soldering the terminals to the cover, a practice which tends to set up vulnerable conditions. In the preferred method disclosed herein, the depressed zone of the cover, with the terminals extending through the bottom of the depressed zone, is filled with a plastic composition which, when hardened, practically unites or amalgamates with the cover itself and positively anchors the terminals in position. In practice, it has been found that the structure thus produced so anchors the terminals as to practically require breakage of the cover to remove the terminals.

The cover 16 is also provided with the venting plug 20 which is adapted to be threaded into the cover. The plug 20 is an elongated hollow element having a closed bottom, excepting for a vent 20a, with the top also provided with a vent 20b. The plug is of particular service during charging of the battery, since it permits of the escape of excess gases which may be produced by the charging operation, the gas entering the plug through vent 20a and escaping through vent 20b. If desired, the side wall of the plug may have additional vent openings. Since the plug is threaded to the cover, it can be removed bodily, its opening thus providing a ready filling port for the battery electrolyte.

The battery content comprises a pair of electrodes 21 and 22, a suitable filling material 23, which may be glass wool, a separator 23a between the electrodes, generally formed of wood, a positioning plate 24, and a suitable electrolyte. The electrodes are of suitable dimensions and each is provided with a terminal zone, indicated at 21a and 22a, respectively. The terminals extend upwardly from the electrode body, passing through openings formed in plate 24, terminal 22a preferably being located in alinement with the battery axis, and passing through and being secured to the cover 16 as above explained, with terminal 22a projecting a greater distance above the cover than terminal 21a, the terminal 22a forming the permanent terminal for this end of the battery. The filler material is mounted about the electrodes and separator in the usual manner below plate 24, practically filling the space below the plate, thus practically limiting the electrolytic zone of the battery to this portion of the battery, the filler material serving to assure electrolytic action on the electrodes through the efficacy of the capillary action provided by the glass wool.

Plate 24 is of planar plastic material and of suitable thickness. It has a diameter which may be slightly less than the internal diameter of casing 15, and may, if desired, be additionally formed with peripheral recesses 24a. The plate 24 may be cemented to the terminals 21a and 22a, if desired. The plate thus provides sufficient space for the passage of electrolyte when the latter is being applied, and permits of the free movement of gases during battery charging. At the same time, its diameter prevents material lateral shift of the electrodes. If desired, the plate 24 may loosely fit the interior of the casing, and reliance for this service be placed on recesses 24a.

In practice, the electrolyte practically remains within the portion of the battery below plate 24, due to the capillary action and trapping effect of the glass wool filler, so that the battery can be turned on its side or reversed. Should electrolyte pass above plate 24 under the latter conditions, the possibility of actual leakage from the battery is negligible, due to the presence of vent plug 20 which serves as a trap to prevent such leakage.

As above indicated, an important feature of the present invention is that which permits battery service in different fields at the will of the user, who has the option of using the battery under service conditions in which both terminals are at the same end of the battery, frequent with industrial installations, or when the terminals are at opposite ends of the battery, as is generally the practice in flashlight service. This condition is made possible through the use of a conducting element 25, which may be formed of copper, for instance, which can be applied to or removed from the battery at will without affecting the form of the battery other than that of providing the positions of the battery terminals which are to be placed in service. The element 25 is preferably of sheet form, and bent to provide a body 25a, the length of which practically equals the length of the casing, an upper end zone 25b, which may be of forked type to readily practically embrace the exposed end of terminal 21a, and a lower end zone 25c contoured to fit within depression 17 and channel 17b. If desired, the end zone 25c may be formed of an increased thickness to provide a projecting effect at the bottom of the battery when the element is in position.

As is apparent, the element 25 may be readily snapped into position when desired, the body 25a passing into channel 18, with end zone 25c positioned at the bottom of the battery, and end zone 25b co-operating with terminal 21a. The forked end may be closed about the terminal, if desired, to assure better contact. Since terminal 22a provides the permanent terminal for the upper end of the battery, the projected end of terminal 21a simply contacts the element 25, its activity as a terminal being transferred to the zone 25c at the bottom of the battery. When the user then wishes to transfer the battery to industrial use, he simply withdraws element 25 from its position, leaving the battery with both terminals at its upper end. The projected portion of terminal 21a, as well as terminal 22a, may then be connected with the proper work terminal of the industrial service.

The element 25 is thus an adjunct to the battery instead of forming a permanent and integral portion of the battery structure. It forms a part of the battery assemblage which is supplied with the battery, but is used therewith only at the option of the user. The battery is prepared to enable its use at any time, as the user may elect, but its use or presence is not compulsory. When it is to be inactive, it is entirely removed. Its removal eliminates any possibility of current leakage from terminal 21a to the bottom of the battery casing when the battery is being used under industrial service conditions. As will be understood, this action is made possible through the preparation of the battery casing and the terminal 21a in such manner that the separate element 25 can be moved into and out of position at will, and, when in position, will operate efficiently to provide the desired result. As indicated above, the channel 18 and the depression 17 and channel 17a on the outer face of the casing are permanent conditions of the casing, their presence not affecting the efficient operation of the battery in industrial service.

A modified form of the battery is shown in Figures 5 to 8. The cover zone is changed to provide a depth thereof and the depression 19 omitted, the terminals being cemented in position. In this form, terminal 21a does not project from the cover, the latter having an exposed recess 18d, Figure 6, for receiving the upper end of element 25 which, in this form, need not be forked, end zone 25b extending into contact with the terminal in the plane of such upper end. Since terminal 21a is not exposed above the top, terminal 22a need not have the exposed length of this terminal in the first form. In this form the plate 24 is shown as provided with perforations 24b instead of the recesses 24a of the preferred form. As in the preferred form, the element 25 is positionable and removable at will. While the modified form of battery is serviceable for particular uses, the form shown in Figures 1 to 4 is preferred for general service conditions.

Either form of the battery will provide efficient service under either type of service conditions, since the fundamentals of the battery are the same with both types. Hence, the battery can be manufactured under the more favorable conditions of not requiring individual forms for the two types of service, thus enabling lower costs of manufacture. Being of the re-chargeable type, the battery is capable of long-life use. While both forms are readily re-chargeable, the preferred form provides this in a simpler manner since both terminals are exposed above the top permitting ready attachment of the connections with the charging apparatus.

While the element 25 is separable from the battery, it is of simple form and can be readily stored when not in use. Aside from the ability to render the battery serviceable in both types, its removability is of definite advantage due to the fact that its absence prevents any possibility of leakage of current to a supporting surface when the battery is being used under industrial conditions. With the element permanently positioned on the battery, insulation of the lower end of the battery from its support would be practically essential if leakage is to be prevented, a condition which tends to restrict such battery to a single type of service. The element 25 is readily snapped into or removed from position, providing efficient service when in position, with its absence preventive of the leakage referred to.

While I have herein shown and described several forms of the invention, it is evident that changes and/or modifications therein may be found essential or desirable in meeting the exigencies of service and/or the individual desires of a particular user. I therefore reserve the right to make any and all such changes and/or modifications so deemed essential or desirable insofar as the same may fall within the spirit and scope of the invention as expressed in the accompanying claims, when broadly construed.

What is claimed as new is:

1. In battery assemblies of the storage battery type, wherein the assembly includes a covered casing carrying the electrodes and their terminals, the electrolyte, and a venting unit, and wherein the assembly is serviceable under optional conditions of service at will with the assembly options presenting respectively either that both terminals are active as service terminals solely at one end of the battery or that the two terminals are rendered active as service terminals by presenting a single terminal as serviceably active at each end of the battery and with the option selection applicable at will and under user control, an assembly of such type having the terminals of its electrodes exposed for service at the same end of the casing and with the opposite end of the casing imperforate and permanently closed and being normally free from terminal exposure, and a U-shaped conductor element of sheet type externally positionable and removable at will relative to the top, side and bottom of the casing, said element in such position being co-operative with one of said exposed terminals and being thereby rendered active to transfer the activity of such terminal to the opposite end of the casing.

2. An assembly as in claim 1 characterized in that the exposed face of the bottom of the casing is formed with a contoured depression to detachably receive and anchor the lower end zone of the conductor element and to expose a portion of the element end zone for service as a battery terminal at such end of the battery to thereby provide the battery with a potentially-active terminal at each end of the battery.

3. An assembly as in claim 2 characterized in that the exposed side of the casing and its attached cover is formed with an exposed longitudinally extending groove for the reception of the body of the conductor element, said groove having a depth greater than the thickness dimension of the body of the element to thereby place the positioned element body as depressed relative to the normal periphery of the battery side.

4. An assembly as in claim 3 characterized in that the upper zone of the conductor element is bent laterally to overlie the cover of such zone of the battery and to contact one of the battery terminals exposed relative to the exposed top of the cover, when the element is actively positioned on the battery.

5. An asembly as in claim 4 characterized in that the other terminal of the pair of terminals constitutes a permanent terminal of the battery and is exposed above the top plane of the battery cover a distance sufficiently greater than that of such first terminal as to permit the positioning of the bent zone of the conductor element into active contact with the first terminal with the outer face of the bent zone spaced inwardly from the plane of the exposed end of the second terminal, whereby the current path through the first terminal is rendered active in the circuit solely at the opposite end of the battery through the conducting element.

6. An assembly as in claim 1 characterized in that both permanent terminals project through and above the outer plane of the cover, and further characterized by the conductor element including an upper end zone having an anchoring configuration adapted to co-operate solely with one of said terminals.

7. An assembly as in claim 1 characterized in that the outer face of the casing cover includes a depressed zone with one of the terminals exposed in the plane of the bottom of the depression, and further characterized by the conductor element having a laterally-extending zone positionable in such cover depression and in overlying contact engagement with such exposed terminal end.

8. An assembly as in claim 1 characterized in that the casing cover is formed with an open-top depressed zone with a pair of terminals extending through the bottom of said zone and projecting above the outer plane of the cover, said zone being adapted to receive a solidifiable plastic material for anchoring the terminals to the cover.

9. An assembly as in claim 8 characterized in that the cover is formed of a solidified material and further characterized in that the plastic material for filling the depressed zone is such as will tend to amalgamate with the cover material with which it contacts to thereby complete the solidified cover with its anchored terminals.

BENJAMIN D. EMANUEL.

REFERENCES CITED

The following references are of record in the file of this patent:

UNITED STATES PATENTS

| Number | Name | Date |
|---|---|---|
| 1,464,573 | Heise et al. | Aug. 14, 1923 |
| 1,481,226 | Rhodes | Jan. 15, 1924 |
| 1,603,443 | Benner | Oct. 19, 1926 |
| 2,035,995 | Sturges | Mar. 31, 1936 |
| 2,415,593 | James | Feb. 11, 1947 |
| 2,445,556 | Bircher | July 20, 1948 |